United States Patent Office 3,206,489
Patented Sept. 14, 1965

3,206,489
ORGANOTIN COMPOUNDS CONTAINING A THIOCARBOXYL GROUP
Walter Stamm, Dobbs Ferry, N.Y., and Byron H. Lake, Mountain View, Calif., assignors to Stauffer Chemical Company, New York, N.Y., a corporation of Delaware
No Drawing. Filed July 3, 1962, Ser. No. 207,398
5 Claims. (Cl. 260—429.7)

This invention relates to organic compounds of tetravalent tin wherein one of the organic substituents attached to the tin always contains an alkyl radical having a terminal aliphatic thiocarboxyl grouping. The invention also pertains to a method of preparing the aforesaid tin compounds.

In its broadest aspects, the present invention contemplates organotin compounds of the following general formula:

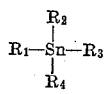

wherein each of $R_1$, $R_2$, $R_3$ and $R_4$ signifies an alkyl radical of from 1 to 12 carbon atoms, e.g. methyl, ethyl, n-butyl, isobutyl, sec. pentyl, n-hexyl, n-octyl, isooctyl, n-decyl, dodecyl, and the like, and an aromatic hydrocarbon radical such as phenyl and naphthyl, it being understood that at least one of said $R_1$, $R_2$, $R_3$ and $R_4$ is an alkyl radical terminating in a lower aliphatic thioacid grouping characterized by the presence of a thiocarboxyl function as exemplified by thioacetoxy, thiopropionoxy, thiobutyroxy and the like. Ordinarily, the thioacid substituent is thioacetoxy.

Specific tin compounds falling within the ambit of the general formula are formalistically depicted in the following list:

Compound 1: $(C_2H_5)_3SnCH_2CH_2CH_2 \cdot S \cdot CO \cdot CH_3$
Compound 2: $(n\text{-}C_4H_9)_3SnCH_2CH_2CH_2 \cdot S \cdot CO \cdot CH_3$
Compound 3: $(n\text{-}C_4H_9)_3Sn(CH_2)_{11} \cdot S \cdot CO \cdot CH_3$
Compound 4: $(i\text{-}C_4H_9)_3Sn \cdot CH_2CH_2CH_2S \cdot COCH_3$
Compound 5: $(n\text{-}C_4H_9)_3Sn \cdot CH_2CH_2 \cdot S \cdot CO \cdot CH_3$
Compound 6: $(n\text{-}C_8H_{17})_3SnCH_2CH_2CH_2 \cdot S \cdot CO \cdot CH_3$
Compound 7: $(n\text{-}C_{12}H_{25})_3Sn \cdot CH_2CH_2CH_2S \cdot COCH_3$
Compound 8: $(n\text{-}C_4H_9)_2Sn(CH_2CH_2S \cdot COCH_3)_2$
Compound 9: $(C_6H_5)_2Sn(CH_2CH_2SCOCH_3)_2$
Compound 10: $Sn(CH_2CH_2S \cdot CO \cdot CH_3)_4$
Compound 11:

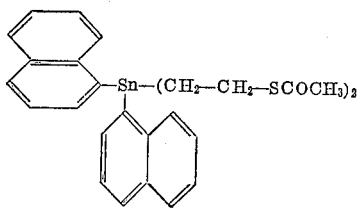

Compound 12: $(CH_3)_3SnCH_2CH_2CH_2SCOCH_3$
Compound 13: $(n\text{-}C_6H_{13})_2Sn(CH_2CH_2SCOCH_3)_2$
Compound 14: $(C_2H_5)_3SnCH_2CH_2CH_2SCO\text{-}nC_4H_9$
Compound 15: $(C_2H_5)_3Sn(CH_2)_5SCOCH_3$ The new and novel organotin compounds of the present invention are realized by reacting an aliphatic thioacid with a tetravalent organotin intermediate having attached thereto at least one terminally unsaturated alkenyl radical having from 1 to 12 carbon atoms. The reaction is carried out in the presence of actinic radiation which produces a catalytic addition of the thioacid to the double bond of the alkyl group. In general, it has been ascertained that excellent results are achieved when the organotin intermediate is contacted with an excess of the thiocarboxylic acid in the presence of U.V. light as the source of actinic radiation while maintaining the temperature in the range of —80° C. to below 100° C. The addition of the thioacid to the olefinic double bond of the alkenyl is preferably carried out in a relatively inert organic solvent which is liquid under the reaction conditions, and in this connection, reference is made to the lower saturated aliphatic hydrocarbons such as pentane, hexane, and the like. In some instances, the reaction is facilitated by the use of certain auxiliary materials and for this purpose a small amount of an organic peroxide such as benzoylperoxide has been found especially efficacious. However, these adjuncts are not essential since the reaction will proceed in their absence.

The unsaturated organometallic compounds which constitute the starting materials for the process of the invention are known chemical intermediates, the description and synthesis of which can be found in the technical literature. In general, they can be prepared by reacting an unsaturated organomagnesium halide with the appropriate tin halide thereby producing an organotin derivative having at least one unsaturated alkenyl group. Some of the unsaturated organotin intermediates are available commercially as exemplified by the relatively simple allyl and vinyl derivatives.

The organotin compounds as contemplated herein constitute a new class of chemical compounds having a wide spectrum of uses. They are, for instance, valuable intermediates which can be further transformed into other useful products. The thioacid function undergoes saponification with aqueous alkaline reagents and is replaced by a mercapto radical. The organotin compounds of the invention are also characterized by marked biocidal properties, being especially efficacious as herbicides. For instance, Compound 2 gave 90% control of crab grass and curly dock and 100% control of red-root pigweed when applied to these weeds at a rate of five pounds per acre. The compound was also effective at this concentration for desiccating the leaves of cotton plants. It can also be used as a pre-emergent herbicide for preventing the emergence of such weeds as crab grass, green foxtail, watergrass, red-root pigweed, mustard and curly dock. In this application, the dosage of the toxicant was 20 pounds per acre. The compounds of the present invention also show utility as microbiocides and were found effective in controlling *Aspergillus niger*, *Penicillium sp.* and soil fungi such as *Rhizoctonia solani* and *Fusarium solani*. In foliage fungicide tests, the organotin compounds were useful in combating rust and powdery mildew of the type afflicting beans.

The compounds and procedures of the present invention will become more apparent from the following examples. It is to be understood, however, that they are presented for illustrative purposes only and that variations in practicing the invention without departing from the scope and spirit thereof will be apparent to those skilled in the art to which the said invention pertains.

EXAMPLE 1

*2-thioacetoxyethyltri-n-butyltin*
$(n\text{-}C_4H_9)_3Sn \cdot CH_2CH_2S \cdot CO \cdot CH_3$ In a Vycor flask, equipped with a stirrer, 320 g. (1 mole) of vinyltributyltin was mixed with 95 g. (1.2 moles) of thioacetic acid at room temperature. The mixture was agitated and irradiated with a 500-watt lamp for three hours. Then unreacted thioacetic acid was distilled at reduced pressure (0.5 mm.) at room temperature. In the reaction flask remained 398 g. (quantitative yield) of a clear, colorless oil, which was then distilled, the main fraction boiling at 115° C./0.2 mm.; $n_D^{23}$ 1.524; sulfur found 8.1%, calculated 8.1%. Also the I.R. spectrum confirmed the proposed structure.

EXAMPLE 2

*3-thioacetoxypropyltri-n-butyltin*
$(n\text{-}C_4H_9)_3SnCH_2CH_2CH_2S\cdot COCH_3$ To 160 g. (0.5 mole) of allyltributyltin was added with stirring and outside ice-cooling 46 g. (0.59 mole) of distilled thioacetic acid. At 0° C. the agitated mixture was irradiated with a U.V. light for 3 hours. Then a small amount of thioacetic acid was distilled off at 0.2 mm. Hg. The remaining clear, practically colorless oil was then fractionally distilled: The main fraction (85%) distilled at 120° C./0.2 mm. The clear, colorless oil had a refractive index of $n_D^{23}$ 1.4986. The elemental analysis confirmed the structure.

EXAMPLE 3

*3-thiobutyroxypropyltri-n-butyltin*
$(n\text{-}C_4H_9)_3SnCH_2CH_2CH_2S\cdot COCH_2CH_2CH_3$ To 25 g. (0.076 mole) of allyltributyltin in a 100 cc. Vycor flask was added with stirring and outside ice-cooling 9.3 g. (0.089 mole) of thiobutyric acid. At 0° C. the agitated mixture was irradiated with a U.V. light for 4 hours. 1.6 g. of unreacted thiobutyric acid was distilled off at 0.3 mm. Hg. The remaining clear, light yellow oil was purified by fractional distillation. The first fraction (4.5 g.) was unreacted allyltributyltin (B.P. 85°/0.4 mm.). The main fraction, 26.4 g. (80%), a light yellow oil boiling at 118° C./0.4 mm., analyzed correctly for the proposed structure.

The preparative procedure as delineated in the examples is applicable generally to the synthesis of organotin compounds of the type contemplated herein. In this connection, the method has been carried out with a variety of saturated aliphatic thioacids wherein the number of carbon atoms ranged from 1 to 18.

We claim:

1. An organotin compound having the following formula:

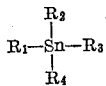

wherein $R_1$, $R_2$, $R_3$ and $R_4$ are each selected from the class consisting of an alkyl radical of from 1 to 12 carbon atoms and an aromatic hydrocarbon radical of the benzene and naphthalene series, it being understood that at least one of said $R_1$, $R_2$, $R_3$ and $R_4$ is an alkyl radical having attached to the terminal carbon atom thereof a thiocarboxyl function of a saturated thiocarboxylic acid having from 1 to 4 carbon atoms.

2. An organotin compound of the formula:

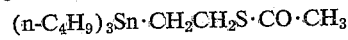

3. An organotin compound of the formula:

4. An organotin compound of the formula:

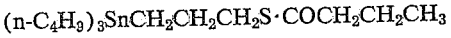

5. A method of preparing an organotin compound having the following formula:

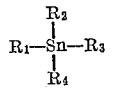

wherein $R_1$, $R_2$, $R_3$ and $R_4$ are each selected from the class consisting of an alkyl radical of from 1 to 12 carbon atoms and an aromatic hydrocarbon radical of the benzene and naphthalene series, it being understood that at least one of said $R_1$, $R_2$, $R_3$ and $R_4$ is the esterifying moiety of a saturated aliphatic thiocarboxylic acid of from 1 to 4 carbon atoms which comprises the addition in the presence of actinic light of a saturated aliphatic thiocarboxylic acid of from 1 to 4 carbon atoms to an unsaturated tetravalent tin precursor of the same carbon configuration as above depicted having in lieu of at least one of the alkyl radicals its corresponding terminally ethylenically unsaturated counterpart and isolating the so obtained organotin compound.

References Cited by the Examiner

UNITED STATES PATENTS 2,934,548  4/60  Fath _____ 260—429.7
3,029,267  4/62  Berenbaum et al. _____ 260—429.7

OTHER REFERENCES

Seyferth: J.A.C.S., vol. 79, pp. 2133 to 2136 (1957).

TOBIAS E. LEVOW, *Primary Examiner.*
ABRAHAM H. WINKELSTEIN, *Examiner.*